Patented Feb. 12, 1946

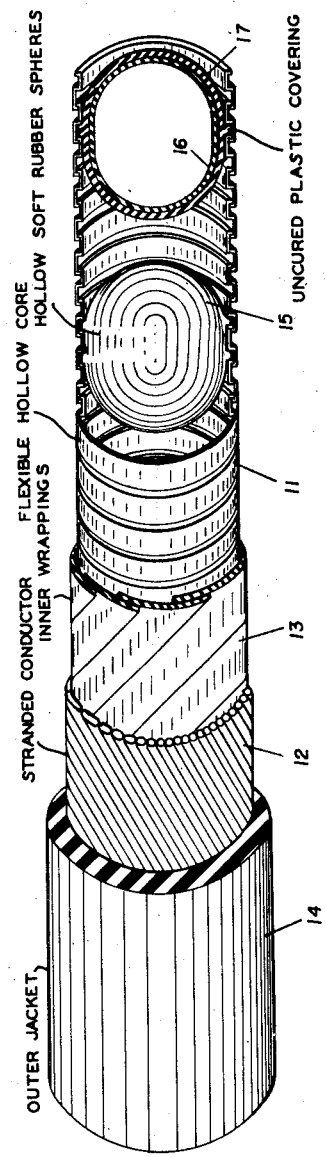

2,394,611

UNITED STATES PATENT OFFICE 2,394,611

ELECTRIC CABLE

Latimer F. Hickernell, Irvington, and James E. Talbott, Dobbs Ferry, N. Y., assignors to Anaconda Wire & Cable Company, New York, N. Y., a corporation of Delaware Application January 3, 1941, Serial No. 372,984

8 Claims. (Cl. 174—110)

This invention relates to cable for the transmission of electrical energy, one of the primary objects being to provide a cable which, having a specific gravity less than that of water, will float without the necessity of supporting rafts or buoys.

There are many occasions where a cable of this type is desirable. For example, when a temporary cable is required across a body of water a much shorter length will obviously be necessary if the cable floats at the surface of the water instead of lying on the bottom. Another example is found in the case where it is necessary to supply electrical energy to a boat or similar object which is itself floating. Unless the cable is buoyant it is necessary to drag the cable across the bottom where it may be fouled by the propeller of the craft or may be damaged by underwater obstructions.

Still another advantage of the floating cable lies in the fact that it may be readily inspected at all times and need not be hauled out for examination as is the case with ordinary submarine cables. Furthermore, any repairs which are necessary from time to time may be made from a small boat and do not require the services of a diver.

If a floating cable is to be commercially successful it must fulfill the following requirements:

(1) It must be of reasonable diameter. Obviously, it is possible to construct a cable which will float and transmit the required amount of electrical energy if there is no limit placed on its physical size. However, to be practical from the standpoint of shipment and installation the diameter must be such that the cable can be wound on reels which are not of excessive size. Necessarily a certain amount of metal, which has considerable weight, must be used for the conductor and therefore the balance of the cable must be largely filled with gas to give the required buoyancy. If materials other than a gas are used a considerably greater quantity will be required to compensate for the weight of the metal. Apparently, therefore, any successful floating cable will include gas chambers.

(2) If gas is to be used in the interior of the cable the chambers within which it is contained must be sectionalized. If a single gas chamber extends throughout a considerable length of the cable any leak in this part of the cable will result in a large loss of gas which is replaced by water. Since the margin of buoyancy is small the failure of one large section might easily result in sinking the entire length of cable. Therefore any cable of this type which contains gas should be sectionalized into a large number of individual chambers.

(3) It is of course apparent that any cable designed for this type of service must have sufficient flexibility and structural strength to withstand such handling and continual flexing as would be encountered by a cable floating on the surface of the water.

These requirements are fulfilled by the cable illustrated in the accompanying drawing in which a cable constructed in accordance with our invention is illustrated by way of example, parts of the cable being shown removed or in section to reveal the various features of the construction.

Referring to the drawing, the core of the cable consists of a flexible tube 11 of interlocked metal strip, preferably of the kind commonly used to convey liquids and gases under pressure since a hose of this type is, for all practical purposes, liquid-tight. The metal of which the tube is formed is a matter which may be left to the discretion of the manufacturer, either aluminum or bronze having proved to be entirely satisfactory. The chief consideration, of course, is to secure a maximum degree of strength with a minimum weight. Inasmuch as flexible metallic hose of this type is made up from metallic strip which is given an extremely short lay, the hose is not efficient as a conductor of electricity, as the current tends to follow the path of the strip, inasmuch as there is considerable contact resistance between adjacent spirals of metal. For this reason it is necessary to employ a separate conductor whenever an appreciable current is to be carried.

Such a conductor 12 is indicated in the drawing and may conveniently consist of an extremely large number of wires, as many as 200, of relatively small diameter (approximately No. 18 A. W. G.).

As a cable of this type will necessarily be continually flexed while in service there is a possibility that the small wires making up the conductor 12 may be caught between the convolutions of the flexible metal hose 11. This may be avoided by interposing a protective layer 13 of paper, fabric, or rubber between the conductor 12 and the flexible tube 11. A rubber-filled tape, which consists of a fabric tape coated with unvulcanized rubber, serves the purpose excellently since upon vulcanization the overlapping strips are united to form a single continuous sheath and any possibility of the individual wrappings becoming misplaced and allowing the conductor to come in contact with the hose is eliminated.

An insulating jacket 14 may be applied over the conductor and this will preferably be formed of rubber so that there will be no contact between the conductor and the water in which the cable floats. The rubber jacket may of course be formed in any one of a number of ways, either by extrusion or by wrapping a series of unvulcanized rubber tapes helically about the conductor. In any event, the entire assembly is then subjected to heat and pressure so as to vulcanize the two layers of rubber 14 and 13, and the cable is then ready for use.

The outer jacket may of course be greatly varied to meet specific conditions of use; for example, a woven or braided outer covering either of metal or fabric may be applied if the cable is to be subjected to mechanical abrasion. On the other hand, in some instances it may be desirable to entirely eliminate the insulating jacket 14 and in its stead use individually insulated wires to form the conductor. Either enamels or plastic compounds of a resinous or rubber-like nature may be used. If this is done, it will of course be unnecessary to apply an outer insulating jacket since each wire will be insulated from the surrounding water by its own coat of enamel.

Returning to the core of the cable, it has been previously stated that the gas chambers to which the cable owes its buoyancy should be sectionalized so that only a limited portion of the core will be flooded in the event of a localized failure.

We are aware that it has been previously suggested that a floating cable may be formed by using a flexible hose as a core and that it is desirable to break down the gas volume into small sections by the use of internal plugs. One of the features of the present invention lies in the fact that the plugs used to divide interior of the flexible metal hose are themselves buoyant—a feature of considerable importance since it is apparent that the entire size of the cable must be materially increased to compensate for any addition in weight.

The plugs 15 which are contemplated in the present invention consist of hollow spheres of rubber or similar resilient compound whose external diameter is somewhat greater than the internal diameter of the hose 11 in which they are to be placed. Preferably the spheres 15 are formed of two layers of material, the inner layer 16 being of cured soft rubber while the outer layer 17 is a thick covering of unvulcanized rubber or a similar plastic mass. The interior of the spheres is filled with a gas, preferably inert, so that it will not tend to age the rubber. The gas may also be maintained under superatmospheric pressure so that the plug will, at all times, attempt to resume a spherical shape, thus placing considerable pressure on the interior of the metal hose and forcing the plastic covering 17 of the plug to conform to the irregular internal contour of the hose.

The plastic outer coating 17 of the plug will of course be vulcanized at the same time as the outer jacket if formed of uncured rubber, or, if desired, various synthetic compounds which maintain their plasticity may be used. It will of course be apparent that it is not necessary to cover the entire outer surface of the plug with the plastic compound; the purpose of the coating will be served if the unvulcanized material is applied in the form of a band over that portion of the exterior of the plug which comes in contact with the interior of the hose.

From the nature of this cable it will be apparent that in designing for any given condition it will be necessary first to ascertain the size of conductor which will be necessary, and then to calculate the weight of each element involved in the construction. If the specific gravity of the completed cable designed in this manner is considerably above that of water it will be necessary to increase the diameter of the flexible tube 11 so as to give a greater buoyancy to the cable. Conversely, the diameter of the cable may be decreased if the specific gravity is considerably less than that of water.

It will be obvious from the description of the present invention that many changes may be made in the materials of which the plugs, flexible hose, conductor, jackets, or wrappings are formed, and that it is to be understood that the invention might be embodied in various forms without departing from the spirit of the invention or the scope of the following claims.

What we claim is:

1. An electric cable of the type described comprising a flexible hollow core formed of helically wound metallic strip and plugs within said core serving to divide the interior of the core into a series of water-tight sections, said plugs taking the form of hollow soft rubber spheres, said spheres containing gas under pressure sufficient to maintain the outer surface of the sphere in tight contact with the interior surface of the core.

2. The electric cable described in claim 1 in which the spheres are provided with a coating of uncured plastic compound on those portions of their surface which are in contact with the interior of the core.

3. The electric cable of claim 1 in which a conductor comprising a multiplicity of wires is superimposed on said core.

4. In a cable of the type described, a flexible, self-supporting, hollow core, a conductor surrounding said core, hollow plugs spaced at intervals within said core dividing the interior of the core into a series of water-tight compartments, said plugs having a specific gravity less than that of water and having a diameter, when undeformed, greater than the internal diameter of said core.

5. The cable described in claim 4 in which the hollow plugs are filled with inert gas under superatmospheric pressure.

6. An electric cable adapted to float upon the surface of the water including in its construction a hollow self-supporting core, the interior of said core being blocked at intervals with hollow plugs, said plugs being themselves buoyant and dividing the interior of the core into a series of water-tight compartments, said plugs being held in a compressed condition by said core and an electric conductor positioned about said core, the entire assembly having a specific gravity less than that of water.

7. A core for an electric cable of the type described comprising a self-supporting flexible hose formed of helically wound metallic strip, a conductor stranded about said hose, the continuity of the interior of said hose being interrupted at intervals by hollow plugs serving to divide the interior of the core into a series of water-tight compartments, said plugs being provided with a plastic outer covering adapted to conform itself to the internal configuration of the core, the specific gravity of the combined core and conductor being less than that of water.

8. A buoyant cable designed for the transmission of electrical energy comprising a flexible self-supporting core and plugs within said core dividing the core into a series of water-tight compartments, said plugs taking the form of soft spherical rubber-like balls enclosing a body of gas under sufficient pressure to maintain the outer surface of the plug in contact with the interior surface of the core.

LATIMER F. HICKERNELL.
JAMES E. TALBOTT.